(12) United States Patent
De Sapio et al.

(10) Patent No.: US 11,814,076 B2
(45) Date of Patent: Nov. 14, 2023

(54) SYSTEM AND METHOD FOR AUTONOMOUS VEHICLE PERFORMANCE GRADING BASED ON HUMAN REASONING

(71) Applicant: GM GLOBAL TECHNOLOGY OPERATIONS LLC, Detroit, MI (US)

(72) Inventors: Vincent De Sapio, Westlake Village, CA (US); Steven W. Skorheim, Los Angeles, CA (US); Iman Zadeh, Los Angeles, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 153 days.

(21) Appl. No.: 17/110,750

(22) Filed: Dec. 3, 2020

(65) Prior Publication Data
US 2022/0176993 A1    Jun. 9, 2022

(51) Int. Cl.
*B60W 60/00* (2020.01)
*B60W 50/06* (2006.01)
*G06N 3/004* (2023.01)

(52) U.S. Cl.
CPC ........ *B60W 60/0011* (2020.02); *B60W 50/06* (2013.01); *G06N 3/004* (2013.01)

(58) Field of Classification Search
CPC .... B60W 60/0011; B60W 50/06; G06N 3/004
See application file for complete search history.

(56) References Cited

U.S. PATENT DOCUMENTS

| | | | |
|---|---|---|---|
| 10,059,334 B1 | 8/2018 | Zhu et al. | |
| 10,407,078 B2 | 9/2019 | Ratnasingam | |
| 2010/0209881 A1 | 8/2010 | Lin et al. | |
| 2016/0314690 A1 | 10/2016 | Yang et al. | |
| 2018/0364710 A1* | 12/2018 | Oppolzer | G05D 1/0212 |
| 2019/0049981 A1* | 2/2019 | Fischer | G05D 1/0088 |
| 2019/0265712 A1 | 8/2019 | Satzoda et al. | |
| 2019/0332109 A1* | 10/2019 | Kolouri | B60W 40/09 |
| 2020/0371518 A1* | 11/2020 | Kang | G05D 1/0221 |
| 2020/0387156 A1* | 12/2020 | Xu | G05B 13/0265 |
| 2021/0213977 A1* | 7/2021 | Aragon | G06N 3/048 |
| 2022/0177000 A1 | 6/2022 | Zadeh et al. | |

OTHER PUBLICATIONS

Stavens, D.M., "Learning to Drive: Perception for Autonomous Cars", Stanford University Dissertation, May 2011, 104 Pages. URL: http://purl.stanford.edu/pb661px9942.

Xie, J., Hilal, A.R. and Kulić, D., 2017. Driving maneuver classification: A comparison of feature extraction methods. IEEE Sensors Journal, 18(12), pp. 4777-4784.

* cited by examiner

*Primary Examiner* — Fadey S. Jabr
*Assistant Examiner* — Naeem Taslim Alam
(74) *Attorney, Agent, or Firm* — CANTOR COLBURN LLP

(57) ABSTRACT

An autonomous vehicle and a system and method for operating the autonomous vehicle. The system includes a control system and a cognitive system. The control system performs a driving action at the autonomous vehicle. The cognitive system generates the driving action using an evaluation model. The evaluation model is generated by operating the cognitive system in response to a training set of data to generate a planned action for operating the autonomous vehicle by the cognitive system, evaluating the planned action to obtain a system performance grade, and updating the cognitive system based on a comparison of the system performance grade to a human-based performance grade.

20 Claims, 12 Drawing Sheets

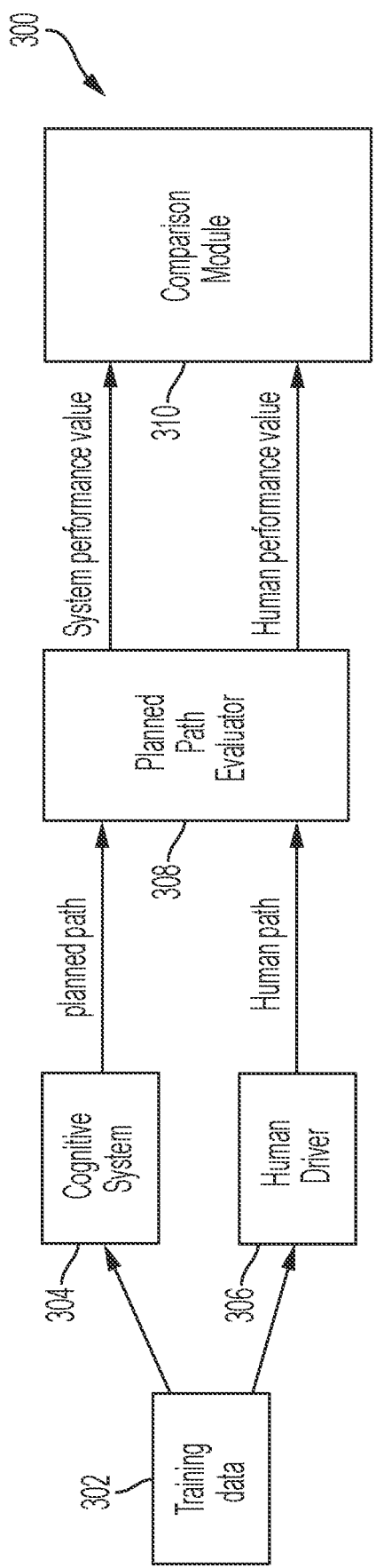
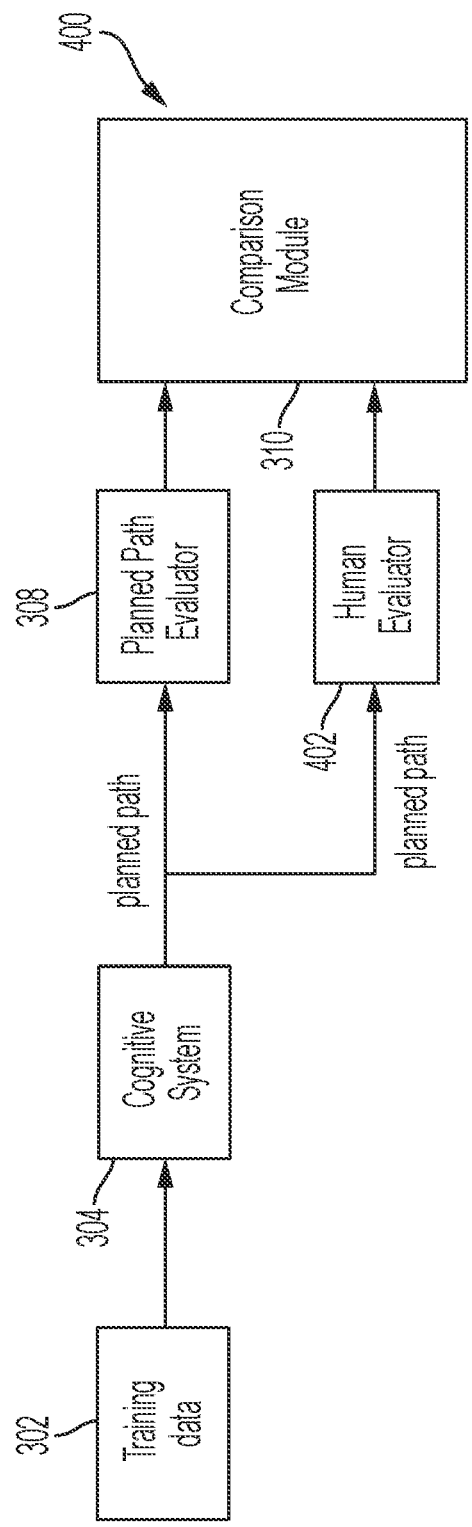
FIG. 3
FIG. 4

SYSTEM AND METHOD FOR AUTONOMOUS VEHICLE PERFORMANCE GRADING BASED ON HUMAN REASONING

INTRODUCTION

The subject disclosure relates to a system and method for operating an autonomous vehicle and, in particular, a system and method for operating the autonomous vehicle to simulate a behavior of a human operator of the vehicle.

An autonomous vehicle operates by detecting objects in its environment or environmental conditions and performing an action in response to its environment. Generally, an autonomous vehicle operates off of a set of instructions that enable the vehicle to react to traffic conditions according to a system-defined behavior. However, this system-defined behavior does not always agree with a behavior that would be generated by an actual human driving the vehicle. It is desirable however to have a passenger of a vehicle be comfortable with the way the vehicle behaves in various traffic situations. Accordingly, it is desirable to provide a system and method for operating an autonomous vehicle that mimics or simulates a behavior of a human driver.

SUMMARY

In one exemplary embodiment, a method for operating an autonomous vehicle is disclosed. A cognitive system is operated in response to a training set of data to generate a planned action for operating the autonomous vehicle. The planned action is evaluated to obtain a system performance grade. The cognitive system is updated based on a comparison of the system performance grade to a human-based performance grade. The autonomous vehicle is operated using the cognitive system.

In addition to one or more of the features described herein, the human-based performance grade is obtained by evaluation of a human-driven path related to the training set of data. The human-based performance grade is obtained by evaluating the planned action by one or more humans. The method includes updating the cognitive system by reducing a difference between the system performance grade and the human-based performance grade. In an embodiment in which an evaluation model generates the system performance grade, the evaluation model including at least one basis metric weighted by a coefficient, the method further includes adjusting the coefficient of the at least one basis metric based on the comparison. The at least one basis metric is related to at least one of a deviation from safe following distance, a deviation from a safe lane change gap, a collision state, and a deviation from average traffic speed. The method further includes determining a complexity score that indicates a difficulty level of a driving scenario for the autonomous vehicle and evaluating the planned action using the system performance grade, the human-based performance grade and the complexity score.

In another exemplary embodiment, a system for operating an autonomous vehicle is disclosed. The system includes a control system and a cognitive system. The control system performs a driving action at the autonomous vehicle. The cognitive system generates the driving action using an evaluation model. The evaluation model is generated by operating the cognitive system in response to a training set of data to generate a planned action for operating the autonomous vehicle by the cognitive system, evaluating the planned action to obtain a system performance grade, and updating the cognitive system based on a comparison of the system performance grade to a human-based performance grade.

In addition to one or more of the features described herein, the human-based performance grade is based on a human-driven path related to the training set of data. The human-based performance grade is based on an evaluation of the planned action by one or more humans. The system further includes a comparison module for updating the cognitive system by reducing a difference between the system performance grade and the human-based performance grade. The comparison module evaluates the planned action using the system performance grade, the human-based performance grade and the complexity score. In an embodiment in which the evaluation model generates the system performance grade and includes at least one basis metric weighted by a coefficient, the system further includes a comparison model for adjusting the coefficient of the at least one basis metric based on the comparison. The at least one basis metric is related to at least one of a deviation from safe following distance, a deviation from a safe lane change gap, a collision state, and a deviation from average traffic speed.

In another exemplary embodiment, an autonomous vehicle is disclosed. The autonomous vehicle includes a cognitive system for generating a driving using an evaluation model. The evaluation model is generated by operating the cognitive system in response to a training set of data to generate a planned action for operating the autonomous vehicle by the cognitive system, evaluating the planned action to obtain a system performance grade, and updating the cognitive system based on a comparison of the system performance grade to a human-based performance grade.

In addition to one or more of the features described herein, the human-based performance grade based on at least one of a human-driven path related to the training set of data and an evaluation of the planned action by one or more humans. The vehicle further includes a comparison module for updating the cognitive system by reducing a difference between the system performance grade and the human-based performance grade. The comparison module evaluates the planned action using the system performance grade, the human-based performance grade and the complexity score. In an embodiment in which and includes at least one basis metric weighted by a coefficient, the vehicle further includes a comparison module for adjusting the coefficient of the at least one basis metric based on the comparison. The at least one basis metric is related to at least one of a deviation from safe following distance, a deviation from a safe lane change gap, a collision state, and a deviation from average traffic speed.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIG. 3 shows a schematic diagram illustrating a method for training the cognitive system in order to operate an autonomous vehicle to simulate a human driver;

FIG. 4 shows a schematic diagram illustrating another method for training the cognitive system to simulate human driving behavior;

DETAILED DESCRIPTION

Figure 1:
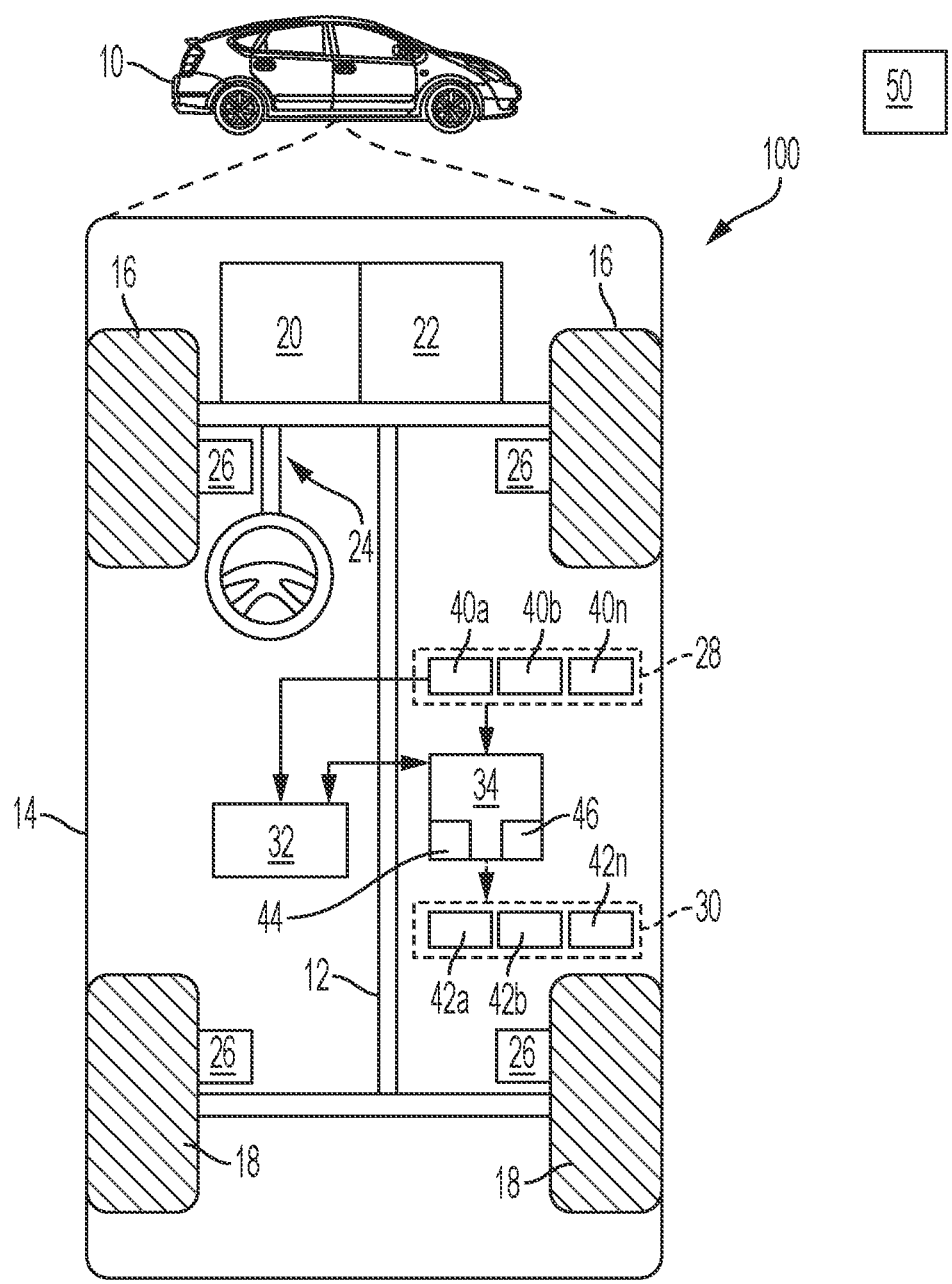
FIG. 1 shows an autonomous vehicle with an associated trajectory planning system in accordance with various embodiments.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

In accordance with an exemplary embodiment, FIG. 1 shows an autonomous vehicle 10 with an associated trajectory planning system depicted at 100 in accordance with various embodiments. In general, the trajectory planning system 100 determines a trajectory plan for automated driving of the autonomous vehicle 10. The autonomous vehicle 10 generally includes a chassis 12, a body 14, front wheels 16, and rear wheels 18. The body 14 is arranged on the chassis 12 and substantially encloses components of the autonomous vehicle 10. The body 14 and the chassis 12 may jointly form a frame. The wheels 16 and 18 are each rotationally coupled to the chassis 12 near respective corners of the body 14.

In various embodiments, the trajectory planning system 100 is incorporated into the autonomous vehicle 10. The autonomous vehicle 10 is, for example, a vehicle that is automatically controlled to carry passengers from one location to another. The autonomous vehicle 10 is depicted in the illustrated embodiment as a passenger car, but it should be appreciated that any other vehicle including motorcycles, trucks, sport utility vehicles (SUVs), recreational vehicles (RVs), etc., can also be used. At various levels, an autonomous vehicle can assist the driver through a number of methods, such as warning signals to indicate upcoming risky situations, indicators to augment situational awareness of the driver by predicting movement of other agents warning of potential collisions, etc. The autonomous vehicle has different levels of intervention or control of the vehicle through coupled assistive vehicle control all the way to full control of all vehicle functions. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, a cognitive processor 32, and a controller 34. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously variable transmission, or other appropriate transmission. The brake system 26 is configured to provide braking torque to the vehicle wheels 16 and 18. The brake system 26 may, in various embodiments, include friction brakes, brake by wire, a regenerative braking system such as an electric machine, and/or other appropriate braking systems. The steering system 24 influences a position of the vehicle wheels 16 and 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors. The sensing devices 40a-40n obtain measurements or data related to various objects or agents 50 within the vehicle's environment. Such agents 50 can be, but are not limited to, other vehicles, pedestrians, bicycles, motorcycles, etc., as well as non-moving objects. The sensing devices 40a-40n can also obtain traffic data, such as information regarding traffic signals and signs, etc.

The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but not limited to, doors, a trunk, and cabin features such as ventilation, music, lighting, etc. (not numbered).

The controller 34 includes a processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and non-volatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which includes an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms.

The controller 34 is further in communication with the cognitive processor 32. The cognitive processor 32 receives various data from the controller 34 and from the sensing devices 40a-40n of the sensor system 28 and performs various calculations in order to provide a trajectory to the controller 34 for the controller 34 to implement at the autonomous vehicle 10 via the one or more actuator devices 42a-42n. A detailed discussion of the cognitive processor 32 is provided with respect to FIG. 2.

Figure 2:
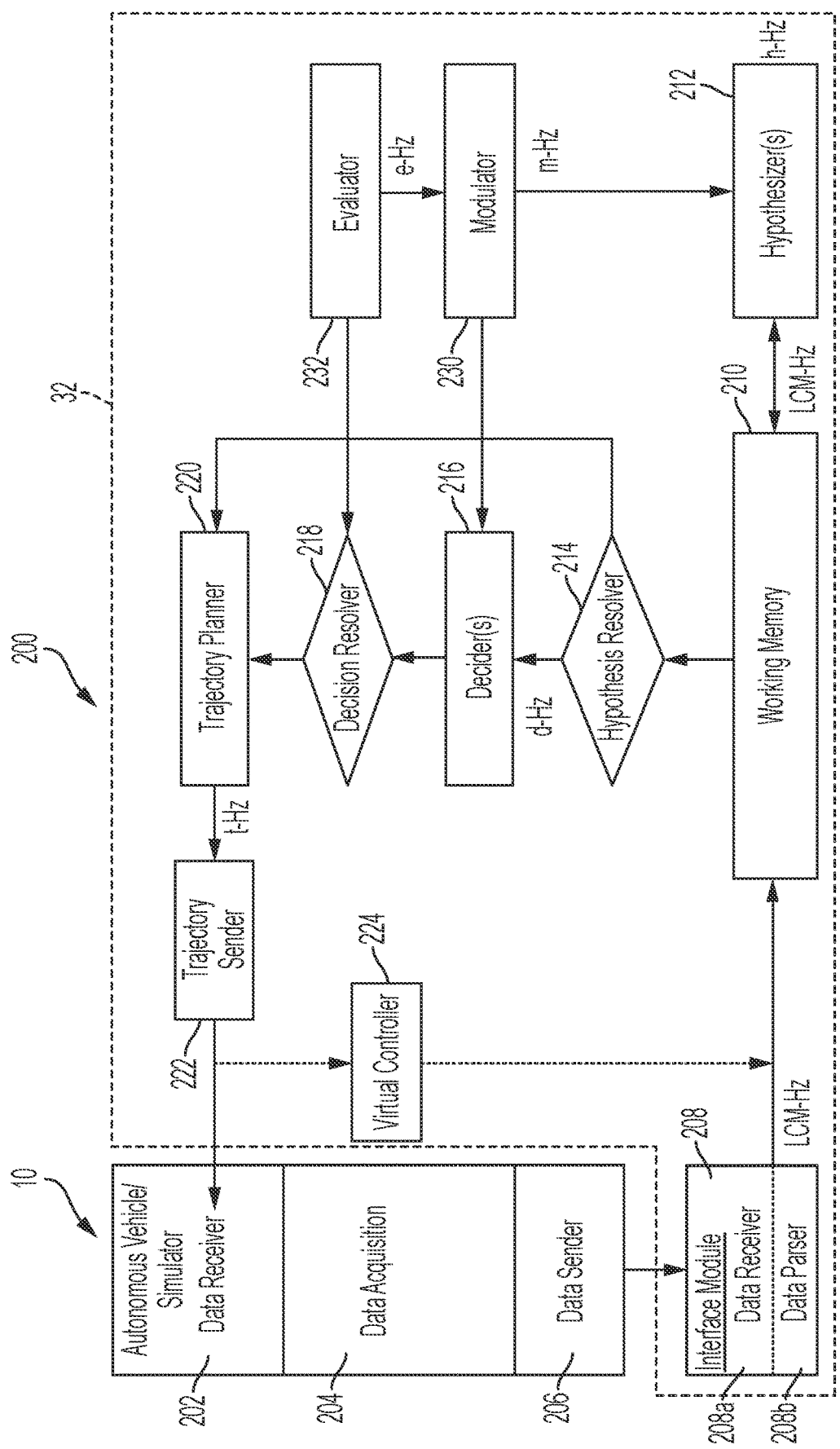
FIG. 2 shows an illustrative control system including a cognitive processor integrated with an autonomous vehicle.

FIG. 2 shows an illustrative control system 200 including a cognitive processor 32 integrated with an autonomous vehicle 10. In various embodiments, the autonomous vehicle 10 can be a vehicle simulator that simulates various driving scenarios for the autonomous vehicle 10 and simulates various responses of the autonomous vehicle 10 to the scenarios.

The autonomous vehicle 10 includes a data acquisition system 204 (e.g., sensors 40a-40n of FIG. 1). The data acquisition system 204 obtains various data for determining a state of the autonomous vehicle 10 and various agents in the environment of the autonomous vehicle 10. Such data includes, but is not limited to, kinematic data, position or pose data, etc., of the autonomous vehicle 10 as well as data about other agents, including as range, relative speed (Doppler), elevation, angular location, etc. The autonomous vehicle 10 further includes a sending module 206 that packages the acquired data and sends the packaged data to the communication interface module 208 of the cognitive processor 32, as discussed herein. The autonomous vehicle 10 further includes a receiving module 202 that receives operating commands from the cognitive processor 32 and performs the commands at the autonomous vehicle 10 to navigate the autonomous vehicle 10. The cognitive processor 32 receives the data from the autonomous vehicle 10, computes a trajectory for the autonomous vehicle 10 based on the provided state information and the methods disclosed herein and provides the trajectory to the autonomous vehicle 10 at the receiving module 202. The autonomous vehicle 10 then implements the trajectory provided by the cognitive processor 32.

The cognitive processor 32 includes various modules for communication with the autonomous vehicle 10, including the interface module 208 for receiving data from the autonomous vehicle 10 and a trajectory sender 222 for sending instructions, such as a trajectory to the autonomous vehicle 10. The cognitive processor 32 further includes a working memory 210 that stores various data received from the autonomous vehicle 10 as well as various intermediate calculations of the cognitive processor 32. A hypothesizer module(s) 212 of the cognitive processor 32 is used to propose various hypothetical trajectories and motions of one or more agents in the environment of the autonomous vehicle 10 using a plurality of possible prediction methods and state data stored in working memory 210. A hypothesis resolver 214 of the cognitive processor 32 receives the plurality of hypothetical trajectories for each agent in the environment and determines a most likely trajectory for each agent from the plurality of hypothetical trajectories.

The cognitive processor 32 further includes one or more decider modules 216 and a decision resolver 218. The decider module(s) 216 receives the most likely trajectory for each agent in the environment from the hypothesis resolver 214 and calculates a plurality of candidate trajectories and behaviors for the autonomous vehicle 10 based on the most likely agent trajectories. Each of the plurality of candidate trajectories and behaviors is provided to the decision resolver 218. The decision resolver 218 selects or determines an optimal or desired trajectory and behavior for the autonomous vehicle 10 from the candidate trajectories and behaviors.

The cognitive processor 32 further includes a trajectory planner 220 that determines an autonomous vehicle trajectory that is provided to the autonomous vehicle 10. The trajectory planner 220 receives the vehicle behavior and trajectory from the decision resolver 218, an optimal hypothesis for each agent 50 from the hypothesis resolver 214, and the most recent environmental information in the form of "state data" to adjust the trajectory plan. This additional step at the trajectory planner 220 ensures that any anomalous processing delays in the asynchronous computation of agent hypotheses is checked against the most recent sensed data from the data acquisition system 204. This additional step updates the optimal hypothesis accordingly in the final trajectory computation in the trajectory planner 220.

The determined vehicle trajectory is provided from the trajectory planner 220 to the trajectory sender 222 which provides a trajectory message to the autonomous vehicle 10 (e.g., at controller 34) for implementation at the autonomous vehicle 10.

The cognitive processor 32 further includes a modulator 230 that controls various limits and thresholds for the hypothesizer module(s) 212 and decider module(s) 216. The modulator 230 can also apply changes to parameters for the hypothesis resolver 214 to affect how it selects the optimal hypothesis object for a given agent 50, deciders, and the decision resolver. The modulator 230 is a discriminator that makes the architecture adaptive. The modulator 230 can change the calculations that are performed as well as the actual result of deterministic computations by changing parameters in the algorithms themselves.

An evaluator module 232 of the cognitive processor 32 computes and provides contextual information to the cognitive processor including error measures, hypothesis confidence measures, measures on the complexity of the environment and autonomous vehicle 10 state, performance evaluation of the autonomous vehicle 10 given environmental information including agent hypotheses and autonomous vehicle trajectory (either historical, or future). The modulator 230 receives information from the evaluator 232 to compute changes to processing parameters for hypothesizers 212, the hypothesis resolver 214, the deciders 216, and threshold decision resolution parameters to the decision resolver 218. A virtual controller 224 implements the trajectory message and determines a feedforward trajectory of various agents 50 in response to the trajectory.

Modulation occurs as a response to uncertainty as measured by the evaluator module 232. In one embodiment, the modulator 230 receives confidence levels associated with hypothesis objects. These confidence levels can be collected from hypothesis objects at a single point in time or over a selected time window. The time window may be variable. The evaluator module 232 determines the entropy of the distribution of these confidence levels. In addition, historical error measures on hypothesis objects can also be collected and evaluated in the evaluator module 232.

These types of evaluations serve as an internal context and measure of uncertainty for the cognitive processor 32. These contextual signals from the evaluator module 232 are utilized for the hypothesis resolver 214, decision resolver, 218, and modulator 230 which can change parameters for hypothesizer modules 212 based on the results of the calculations.

The various modules of the cognitive processor 32 operate independently of each other and are updated at individual update rates (indicated by, for example, LCM-Hz, h-Hz, d-Hz, e-Hz, m-Hz, t-Hz in FIG. 2).

In operation, the interface module 208 of the cognitive processor 32 receives the packaged data from the sending module 206 of the autonomous vehicle 10 at a data receiver 208a and parses the received data at a data parser 208b. The data parser 208b places the data into a data format, referred to herein as a property bag, that can be stored in working memory 210 and used by the various hypothesizer modules 212, decider modules 216, etc. of the cognitive processor 32. The particular class structure of these data formats should not be considered a limitation of the invention.

Working memory 210 extracts the information from the collection of property bags during a configurable time window to construct snapshots of the autonomous vehicle and various agents. These snapshots are published with a fixed frequency and pushed to subscribing modules. The data structure created by working memory 210 from the property bags is a "State" data structure which contains information organized according to timestamp. A sequence of generated snapshots therefore encompasses dynamic state information for another vehicle or agent. Property bags within a selected State data structure contain information about objects, such as other agents, the autonomous vehicle, route information, etc. The property bag for an object contains detailed information about the object, such as the object's location, speed, heading angle, etc. This state data structure flows throughout the rest of the cognitive processor 32 for computations. State data can refer to autonomous vehicle states as well as agent states, etc.

The hypothesizer module(s) 212 pulls State data from the working memory 210 in order to compute possible outcomes of the agents in the local environment over a selected time frame or time step. Alternatively, the working memory 210 can push State data to the hypothesizer module(s) 212. The hypothesizer module(s) 212 can include a plurality of hypothesizer modules, with each of the plurality of hypothesizer modules employing a different method or technique for determining the possible outcome of the agent(s). One hypothesizer module may determine a possible outcome using a kinematic model that applies basic physics and mechanics to data in the working memory 210 in order to predict a subsequent state of each agent 50. Other hypothesizer modules may predict a subsequent state of each agent 50 by, for example, employing a kinematic regression tree to the data, applying a Gaussian Mixture Model/Markovian mixture model (GMM-HMM) to the data, applying a recursive neural network (RNN) to the data, other machine learning processes, performing logic based reasoning on the data, etc. The hypothesizer modules 212 are modular components of the cognitive processor 32 and can be added or removed from the cognitive processor 32 as desired.

Each hypothesizer module 212 includes a hypothesis class for predicting agent behavior. The hypothesis class includes specifications for hypothesis objects and a set of algorithms. Once called, a hypothesis object is created for an agent from the hypothesis class. The hypothesis object adheres to the specifications of the hypothesis class and uses the algorithms of the hypothesis class. A plurality of hypothesis objects can be run in parallel with each other. Each hypothesizer module 212 creates its own prediction for each agent 50 based on the working current data and sends the prediction back to the working memory 210 for storage and for future use. As new data is provided to the working memory 210, each hypothesizer module 212 updates its hypothesis and pushes the updated hypothesis back into the working memory 210. Each hypothesizer module 212 can choose to update its hypothesis at its own update rate (e.g., rate h-Hz). Each hypothesizer module 212 can individually act as a subscription service from which its updated hypothesis is pushed to relevant modules.

Each hypothesis object produced by a hypothesizer module 212 is a prediction in the form of a state data structure for a vector of time, for defined entities such as a location, speed, heading, etc. In one embodiment, the hypothesizer module(s) 212 can contain a collision detection module which can alter the feedforward flow of information related to predictions. Specifically, if a hypothesizer module 212 predicts a collision of two agents 50, another hypothesizer module may be invoked to produce adjustments to the hypothesis object in order to take into account the expected collision or to send a warning flag to other modules to attempt to mitigate the dangerous scenario or alter behavior to avoid the dangerous scenario.

For each agent 50, the hypothesis resolver 2148 receives the relevant hypothesis objects and selects a single hypothesis object from the hypothesis objects. In one embodiment, the hypothesis resolver 214 invokes a simple selection process. Alternatively, the hypothesis resolver 214 can invoke a fusion process on the various hypothesis objects in order to generate a hybrid hypothesis object.

Since the architecture of the cognitive processor is asynchronous, if a computational method implemented as a hypothesis object takes longer to complete, then the hypothesis resolver 214 and downstream decider modules 216 receive the hypothesis object from that specific hypothesizer module at an earliest available time through a subscription-push process. Time stamps associated with a hypothesis object informs the downstream modules of the relevant time frame for the hypothesis object, allowing for synchronization with hypothesis objects and/or state data from other modules. The time span for which the prediction of the hypothesis object applies is thus aligned temporally across modules.

For example, when a decider module 216 receives a hypothesis object, the decider module 216 compares the time stamp of the hypothesis object with a time stamp for most recent data (i.e., speed, location, heading, etc.) of the autonomous vehicle 10. If the time stamp of the hypothesis object is considered too old (e.g., pre-dates the autonomous vehicle data by a selected time criterion) the hypothesis object can be disregarded until an updated hypothesis object is received. Updates based on most recent information are also performed by the trajectory planner 220.

The decider module(s) 216 includes modules that produces various candidate decisions in the form of trajectories and behaviors for the autonomous vehicle 10. The decider module(s) 216 receives a hypothesis for each agent 50 from the hypothesis resolver 214 and uses these hypotheses and a nominal goal trajectory for the autonomous vehicle 10 as constraints. The decider module(s) 216 can include a plurality of decider modules, with each of the plurality of decider modules using a different method or technique for determining a possible trajectory or behavior for the autonomous vehicle 10. Each decider module can operate asynchronously and receives various input states from working memory 210, such as the hypothesis produced by the hypothesis resolver 214. The decider module(s) 216 are modular components and can be added or removed from the cognitive processor 32 as desired. Each decider module 216 can update its decisions at its own update rate (e.g., rate d-Hz).

Similar to a hypothesizer module 212, a decider module 216 includes a decider class for predicting an autonomous vehicle trajectory and/or behavior. The decider class includes specifications for decider objects and a set of algorithms. Once called, a decider object is created for an agent 50 from the decider class. The decider object adheres to the specifications of the decider class and uses the algorithm of the decider class. A plurality of decider objects can be run in parallel with each other.

The decision resolver 218 receives the various decisions generated by the one or more decider modules and produces a single trajectory and behavior object for the autonomous vehicle 10. The decision resolver can also receive various contextual information from evaluator modules 232, wherein the contextual information is used in order to produce the trajectory and behavior object.

The trajectory planner 220 receives the trajectory and behavior objects from the decision resolver 218 along with the state of the autonomous vehicle 10. The trajectory planner 220 then generates a trajectory message that is provided to the trajectory sender 222. The trajectory sender 222 provides the trajectory message to the autonomous vehicle 10 for implementation at the autonomous vehicle 10, using a format suitable for communication with the autonomous vehicle 10.

The trajectory sender 222 also sends the trajectory message to virtual controller 224. The virtual controller 224 provides data in a feed-forward loop for the cognitive processor 32. The trajectory sent to the hypothesizer module(s) 212 in subsequent calculations are refined by the virtual controller 224 to simulate a set of future states of the autonomous vehicle 10 that result from attempting to follow the trajectory. These future states are used by the hypothesizer module(s) 212 to perform feed-forward predictions.

Various aspects of the cognitive processor 32 provide feedback loops. A first feedback loop is provided by the virtual controller 224. The virtual controller 224 simulates an operation of the autonomous vehicle 10 based on the provided trajectory and determines or predicts future states taken by each agent 50 in response to the trajectory taken by the autonomous vehicle 10. These future states of the agents can be provided to the hypothesizer modules as part of the first feedback loop.

A second feedback loop occurs because various modules will use historical information in their computations in order to learn and update parameters. Hypothesizer module(s) 212, for example, can implement their own buffers in order to store historical state data, whether the state data is from an observation or from a prediction (e.g., from the virtual controller 224). For example, in a hypothesizer module 212 that employs a kinematic regression tree, historical observation data for each agent is stored for several seconds and used in the computation for state predictions.

The hypothesis resolver 214 also has feedback in its design as it also utilizes historical information for computations. In this case, historical information about observations is used to compute prediction errors in time and to adapt hypothesis resolution parameters using the prediction errors. A sliding window can be used to select the historical information that is used for computing prediction errors and for learning hypothesis resolution parameters. For short term learning, the sliding window governs the update rate of the parameters of the hypothesis resolver 214. Over larger time scales, the prediction errors can be aggregated during a selected episode (such as a left turn episode) and used to update parameters after the episode.

The decision resolver 218 also uses historical information for feedback computations. Historical information about the performance of the autonomous vehicle trajectories is used to compute optimal decisions and to adapt decision resolution parameters accordingly. This learning can occur at the decision resolver 218 at multiple time scales. In a shortest time scale, information about performance is continuously computed using evaluator modules 232 and fed back to the decision resolver 218. For instance, an algorithm can be used to provide information on the performance of a trajectory provided by a decider module based on multiple metrics as well as other contextual information. This contextual information can be used as a reward signal in reinforcement learning processes for operating the decision resolver 218 over various time scales. Feedback can be asynchronous to the decision resolver 218, and the decision resolver 218 can adapt upon receiving the feedback.

In various embodiments, a cognitive system such as the cognitive processor 32 can be trained in order to operate the autonomous vehicle 10 in a manner that simulates or mimics the behavior of a human driver of the vehicle in various traffic situations. In other words, the cognitive system can be trained to propose and action or trajectory that is the same or substantially the same as an action or trajectory that would be taken by a human driver behind the wheel of the vehicle. The cognitive system can be trained by evaluating the operation of the cognitive system in a traffic scenario using one or more human-based evaluation techniques, as discussed below.

FIG. 3 shows a schematic diagram 300 illustrating a method for training a cognitive system 304 in order to operate an autonomous vehicle to simulate a human driver. A training set of data 302 is provided to the cognitive system 304 and to a human driver 306. The training set of data 302 can be a simulated set of data or a historical data set. The simulated training set can be, for example, a ViRES set of data. The historical data set can be, for example, an NGSIM (Next Generation Simulation) data set. The historical data can include data of traffic traversing a selected section of road during a selected time interval.

In various embodiments, the training set of data 302 includes one or more agent vehicles. The training set of data 302 can be partitioned into time intervals of any select time duration, such as 2-second intervals, for example. When the training set of data 302 is provided to either the cognitive system 304 or the human driver 306, one of the agent vehicles is selected and assigned to be a host vehicle (e.g., the autonomous vehicle) and the cognitive system 304 and human driver 306 operate from the perspective of the assigned host vehicle. The cognitive system 304 then plans a path for the autonomous vehicle based on the traffic conditions (i.e., the trajectories and speeds of the remaining agent vehicles). This process can be repeated by selecting another agent vehicle to be the host vehicle or by performing the process using another time interval, or any combination of these. The planned path generated by the cognitive system 304 is sent to a planned path evaluator 308 which generates a system performance grade based on the planned path. The planned path evaluator 308 submits the planned path to various basis metrics in order to determine a system performance grade Additionally, the training set of data 302 is sent to a human driver 306 in order to evaluate a human-driven path taken by the human driver. In various embodiments, the same selected time intervals and host vehicle assignations can be sent to both the cognitive system 304 and to human driver 306. In another embodiment, the actions taken by the agent vehicle that is selected as the assigned host vehicle in the data set can be used to represent the actions of a human driver. Thus, one of the human driver 306 and the assigned host vehicle from the training set of data generates or supplies a human-driven path. The human-driven path is sent to the planned path evaluator 308 which generates a human-based performance grade for the human driver.

The system performance grade and the human-based performance grade are sent to a comparison module 310. The comparison module 310 adjusts the evaluation model of the planned path evaluator 308. In various embodiments, the adjustments reduce a difference between the system performance value and the human-based performance value. Once the coefficients of the evaluation model have been adjusted, the evaluation model can be used in the autonomous vehicle 10 during real traffic situations.

FIG. 4 shows a schematic diagram 400 illustrating another method for training the cognitive system 304 to simulate human driving behavior. The training set of data 302 is provided to the cognitive system 304. The cognitive system 304 plans a path for the autonomous vehicle as discussed in FIG. 3.

The planned path is sent to a planned path evaluator 308. The planned path evaluator submits the planned path to various basis metrics in order to determine a system performance grade. Additionally, the planned path is sent to a human evaluator 402. The human evaluator 402 assigned a human-based performance grade to the planned path. The system performance grade and the human-based performance grade are sent to a comparison module 310. The comparison module 310 adjusts the evaluation model of the planned path evaluator 308.

Figure 5:
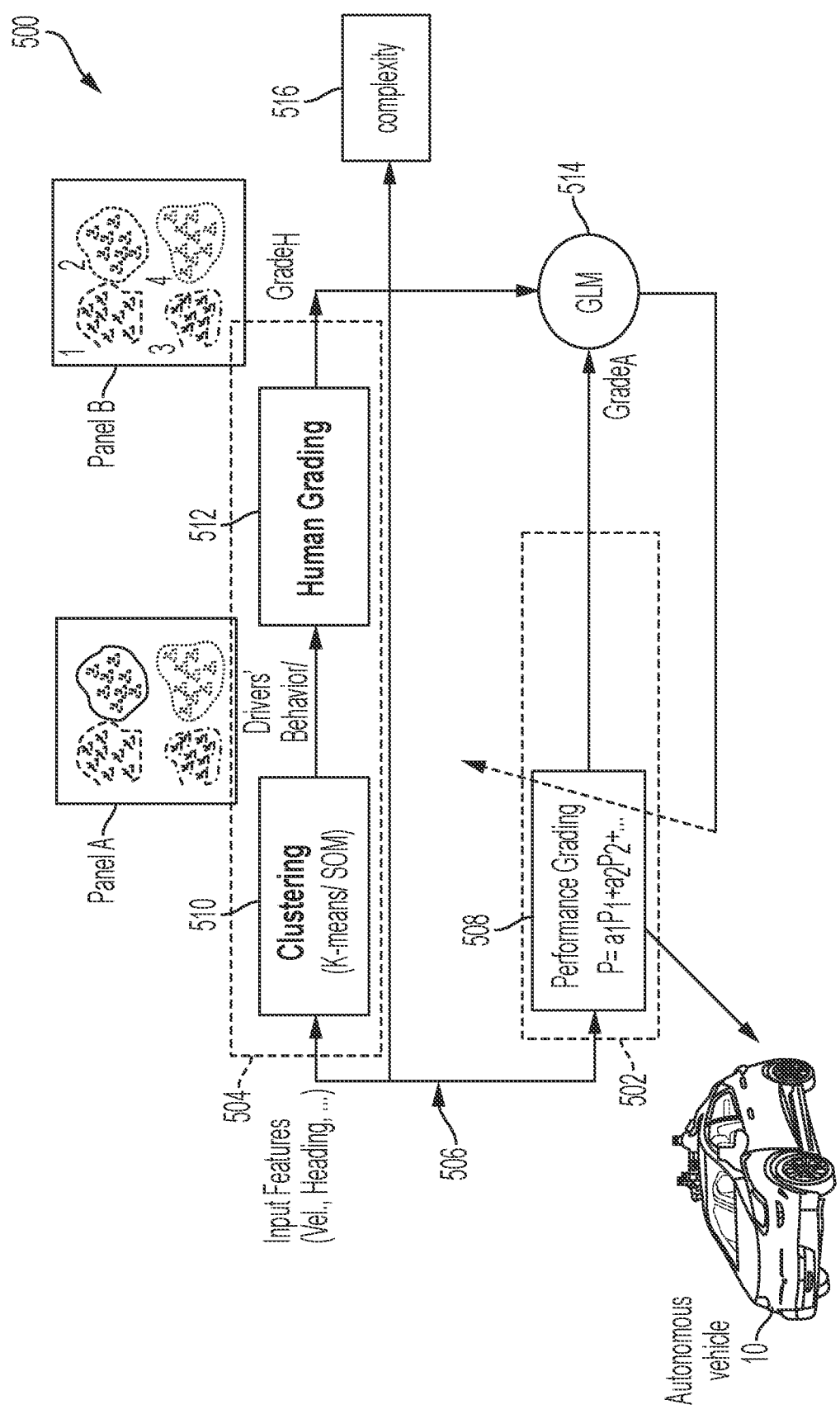
FIG. 5 shows a schematic diagram illustrating details of the method of FIG. 4 for training the cognitive system.

FIG. 5 shows a schematic diagram 500 illustrating details of the method of FIG. 4 for training the cognitive system. The method includes a system-based evaluation path 502 and a human-based evaluation path 504. The system-based evaluation path 502 includes a performance grading module 508 that is used in the planned path evaluator 308. The performance grading module 508 receives input parameters 506 from the cognitive system in response to the training set. The input parameters 506 include, but are not limited to, a planned path of the host vehicle (i.e., planned velocity and planned, heading (orientation, direction) of the host vehicle) as well as velocity and headings for each of the plurality of agent vehicles. The performance grading module 506 generates a system performance grade (GradeA) by subjecting the planned path and input parameters for the agents to one or more basis metrics discussed below. Along another path, a complexity value 516 or a complexity score can be determined based on the input parameters 506.

The performance grading module 506 generates a system performance grade based on a plurality of basis metrics. In other words, the planned path is evaluated based on a plurality of criteria, each criterion generating a sub-grade. Once determined, these subgrades are multiplied by associated coefficients and linearly combined to calculate the system performance grade.

For the illustrative method disclosed herein, there are four sub-metrics or criteria: a deviation of the host vehicle from safe following distance, a deviation of the host vehicle from a safe lane change gap, a collision state, and a deviation of the host vehicle from an average traffic speed.

The deviation from safe following distance criterion is based on a distance between the host vehicle and a closest agent vehicle that is in front of the host vehicle and in the same lane. In an embodiment, the safe following distance is based on a two-second rule indicating a distance the host vehicle travels in two seconds. For the safe following distance criterion, the host vehicle is penalized as a function of the difference between the safe following distance and the actual following distance.

The deviation from safe lane change gap criterion is based on a distance between the host vehicle and agent vehicle in a target lane (e.g., an adjacent lane). The agents directly in front of and directly behind the host vehicle in the target lane are identified. For this criterion, the host vehicle is penalized as a function of the distance to the agent behind the host vehicle and the distance to the agent in front of the host vehicle.

The collision state criterion is determined by determining if a distance between (a center point of) the host vehicle and the nearest agent are within a collision threshold. This can be computed using the shape of convex hulls of both vehicles. If a collision state is detected, the maximum possible penalty is applied.

The deviation from average traffic speed criteria is based on a difference between a velocity of the host vehicle and the velocities of its surrounding agent vehicles. The average speed of all agents within sensor range of the host vehicle are computed. For this criterion, the host vehicle is penalized as a function of the difference between the speed of the host vehicle and the average speed of the other agents.

The human-based evaluation path 504 includes the clustering module 510 and the human grading module 512. The clustering module 510 forms vehicle clusters that include host vehicles exhibiting like behavior. The vehicle clusters are presented to one or more humans at the human grading module 512, who evaluate the behavior of the vehicles within the vehicle clusters and assign a grade (Grade$_H$) to the vehicle clusters, which is entered into the human grading module 512.

The clustering module 510 clusters the vehicles based on the input parameters 506 using a selected clustering method. In an embodiment, the clustering module 510 uses a k-means clustering method. Given a set of observations ($x_1$, $x_2$, ..., $x_n$), where each observation is a d-dimensional real vector, k-means clustering aims to partition the n observations into k ($\leq$n) sets S={$S_1, S_2, ..., S_k$} so as to minimize the within-cluster sum of squares. Formally, the objective, as shown in Eq. (1), is to find:

$$\arg\min_S \sum_{i=1}^{k} \sum_{x \in S_i} \|x - \mu_i\|^2 = \arg\min_S \sum_{i=1}^{k} |S_i| \text{Var} S_i \quad \text{Eq. (1)}$$

where $\mu_i$ is the mean of point in $S_i$. This is equivalent to minimizing the pairwise squared deviations of points in the same cluster as in Eq. (2):

$$\arg\min_S \sum_{i=1}^{k} \frac{1}{2|S_i|} \sum_{x,y \in S_i} \|x - y\|^2 \quad \text{Eq. (2)}$$

where x and y are observations.

In the illustration of FIG. 5, the vehicles are divided into four categories by use of the K-means clustering, as shown in Panel A. The algorithm seeks to divide data sets into clusters that represent the most important elements of the data, maximizing similarity of items within the same group while minimizing similarity of items in different groups. K-means clustering divides groups of data input into a set num(k) of clusters by an iterative method which first assigns k points as means then assigns each data point to be part of a cluster based on which mean the point is closest to. Then new means are calculated to be the center of the cluster, which is the mean of values of the data points in the cluster. Data points are then reassigned to clusters and the process repeats. This eventually converges on a set of means that are no longer changing and are therefore considered to be in the final grouping. Once the vehicles have been clustered, representative video clips can be show to humans for human evaluation.

Voting folders are created. Each voting folder contains an equal number of vehicles from each cluster. For each folder, the performance grading algorithm is applied to provide a performance value based on the four sub-components discussed herein. Each folder is also provided to a human subject who rates each vehicle on a scale of from 1 to 4, where 1 is the worst and 4 is the best. The human rates the vehicle based on its ability to keep a safe following distance, maintain speed relative to the flow of traffic, make lane changes and avoid collisions. This allows a comparison of human grading to the human-based performance value.

The results are analyzed at the comparison module 514 using a generalized linear model (GLM) to find which basis metrics of the evaluation model are most important for the particular scenario of interest. Thus, the numerical coefficients of the evaluation model are extracted and weights are assigned to the basis metrics.

The comparison module 514 compares the human-based grade to the system grade and determines adjustments to the evaluation model of the performance grading module 508 that aligns the system performance value with the human-based performance grade. The adjustments can then be applied to coefficients of the evaluation model of the performance grading module 508. Once the coefficients of the evaluation model have been adjusted, the evaluation model can be used in the autonomous vehicle 10 during real traffic situations.

Figure 6:
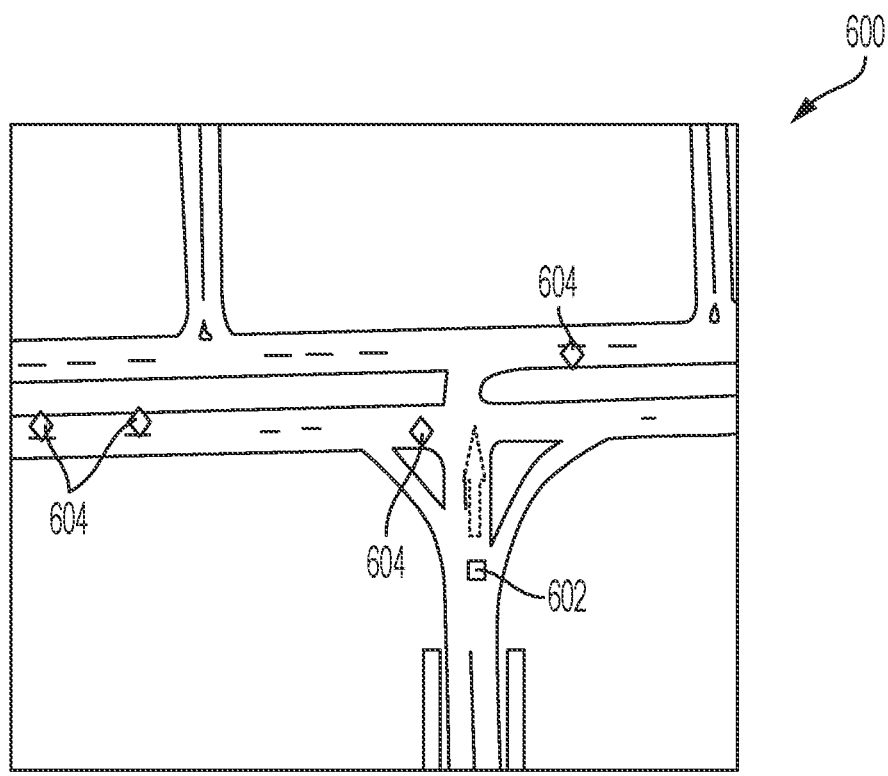
FIG. 6 shows a first road scenario for evaluating the performance of the cognitive system.
Figure 7:
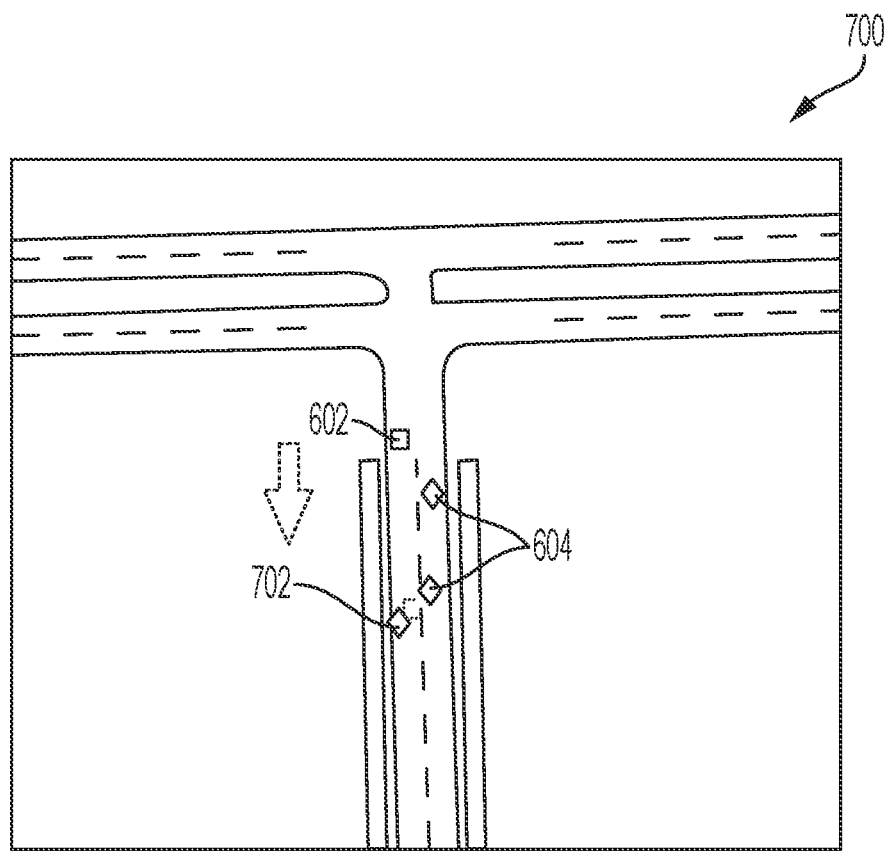
FIG. 7 shows a second road scenario in which a construction zone causes an obstruction that requires the vehicle to move at least partially into an oncoming lane in order to pass the obstruction.
Figure 9:
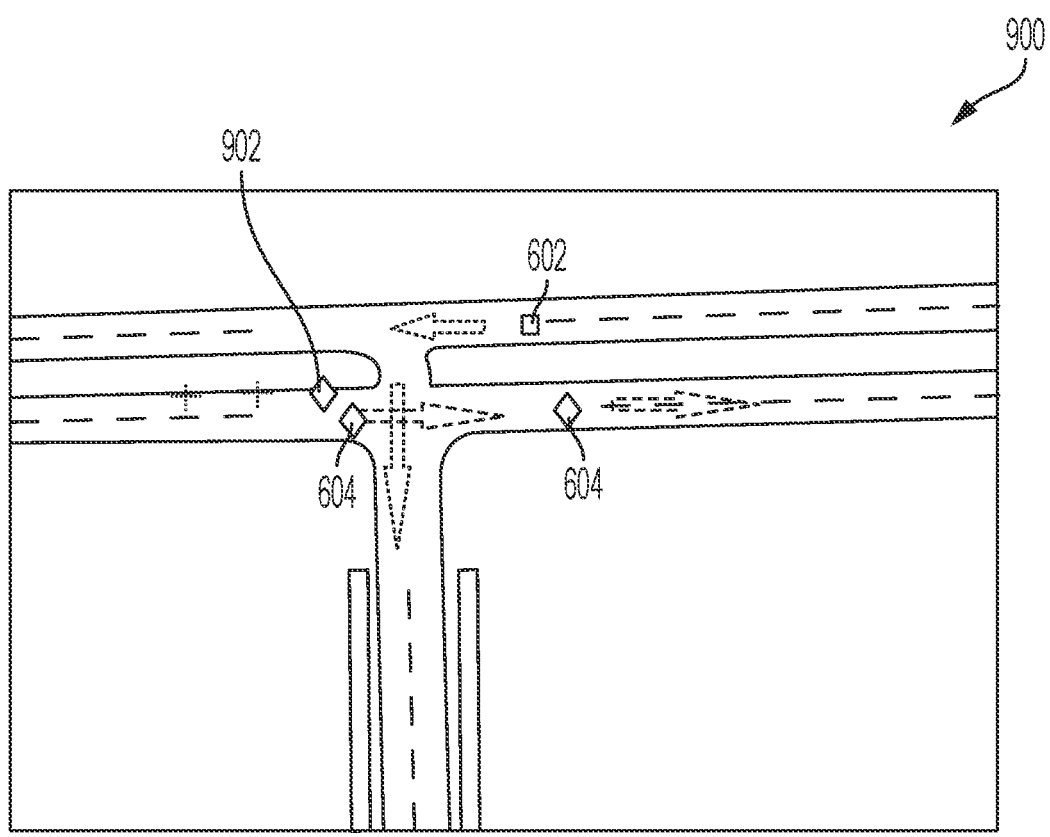
FIG. 9 shows a third road scenario in which an obstacle produces an occluded area of oncoming traffic at an intersection.

FIGS. 6, 7 and 9 show various road scenarios that can be used as a training set of data in order to train the cognitive system using the method disclosed in FIG. 3.

FIG. 6 shows a first road scenario 600 for evaluating the performance of the cognitive system. A host vehicle 602 is identified within the first road scenario 600 and a performance of the host vehicle is evaluated using the methods disclosed herein. In the first road scenario, the host vehicle 602 is approaching an intersection in order to make a left turn. There is no stop sign at the intersection to stop the agent vehicles 604 which are constituting cross-traffic. A grading of the first scenario is based on the host vehicle 602 watching the actions of the agent vehicles 604 in the cross-traffic at the intersection and finding a safe time interval in which to make the left turn. Table 1 shows some illustrative grades obtained over four trials by both a human driver and the cognitive system in response to the first road scenario.

TABLE 1

| Trial | Human | Cognitive |
|---|---|---|
| 1 | 89 | 94 |
| 2 | 84 | 97 |
| 3 | 80 | 92 |
| 4 | 80 | 90 |
| Average | 83 | 93 |

Results from Table 1 show that the performance of the cognitive system is better than the human driver in each of the trials.

FIG. 7 shows a second road scenario 700 in which a construction zone causes an obstruction 702 that requires the host vehicle 602 to move at least partially into an oncoming lane in order to pass the obstruction. A grading of the second scenario is based on the host vehicle 602 watching the actions of the other agent vehicles 604 in the oncoming lane and finding a safe time interval in which to move over while passing the obstruction. Table 2 shows some illustrative grades obtained over three trials by both a human driver and the cognitive system in response to the second road scenario.

TABLE 2

| Trial | Human | Cognitive |
|---|---|---|
| 1 | 89 | 82 |
| 2 | 90 | 92 |
| 3 | 88 | 93 |
| Average | 88 | 89 |

Results from Table 2 show that the performance of the cognitive system is similar to or better than the human driver in each of the trials.

Figure 8:
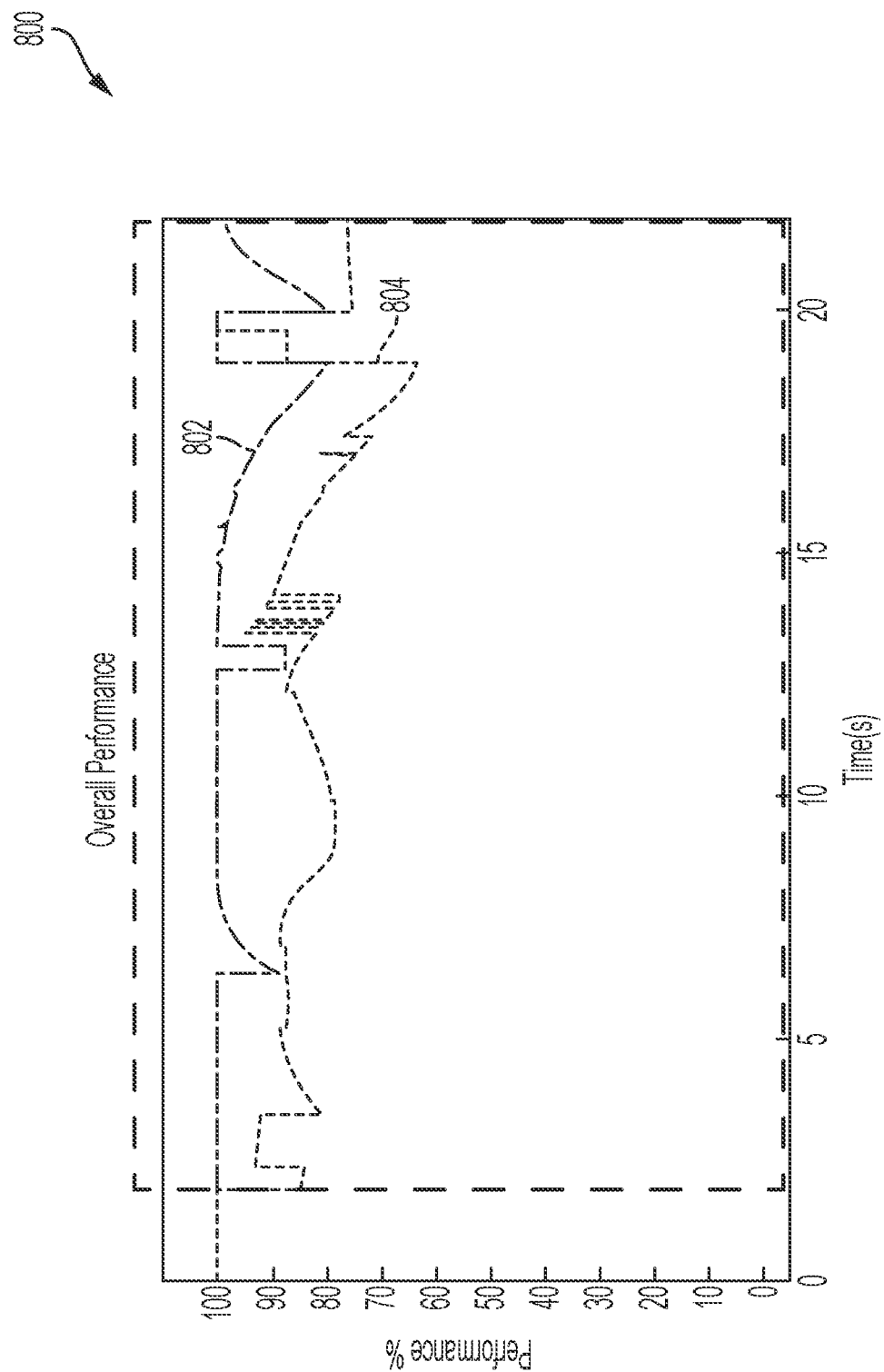
FIG. 8 is an illustrative graph showing performance grades over time for a trial using the second road scenario.

FIG. 8 is an illustrative graph 800 showing performance grades over time for a trial using the second road scenario. Time is shown along the x-axis and performance grade is shown along the y-axis. Curve 802 shows the performance grade over time for the cognitive system and curve 804 shows the performance grade over time for the human driver. By reviewing the performance grade curves of FIG. 8, the cognitive system makes more decisions that comply with the safe distance and traffic speed flow rules and/or criteria. In addition, the cognitive system does not make agile lane changes, which has a negative impact on the system performance grade. As a result, the average system performance grade (curve 802) is higher than the performance grade (curve 804) for the human driver as seen in Table 2.

FIG. 9 shows a third road scenario 900 in which an obstacle produces an occluded area 902 of oncoming traffic at an intersection. A grading of the third scenario is based on the host vehicle 602 coming close to the intersection and watching for oncoming agent vehicles 604 in order to make an uncontrolled left turn. Table 3 shows some illustrative grades obtained over five trials by both a human driver and the cognitive system in response to the third road scenario.

TABLE 3

| Trial | Human | Cognitive |
|---|---|---|
| 1 | 87 | 93 |
| 2 | 89 | 95 |
| 3 | 88 | 99 |
| 4 | 94 | 96 |
| 5 | 92 | 97 |
| Average | 90 | 96 |

Results from Table 3 show that the performance of the cognitive system is better than the human driver in each of the trials.

Similar to the second road scenario, the performance components within the period of interest show that the cognitive system obtains higher performance scores. This is due to the cognitive system employs a more conservative/careful driving scheme than use by the human driver.

Figure 10:
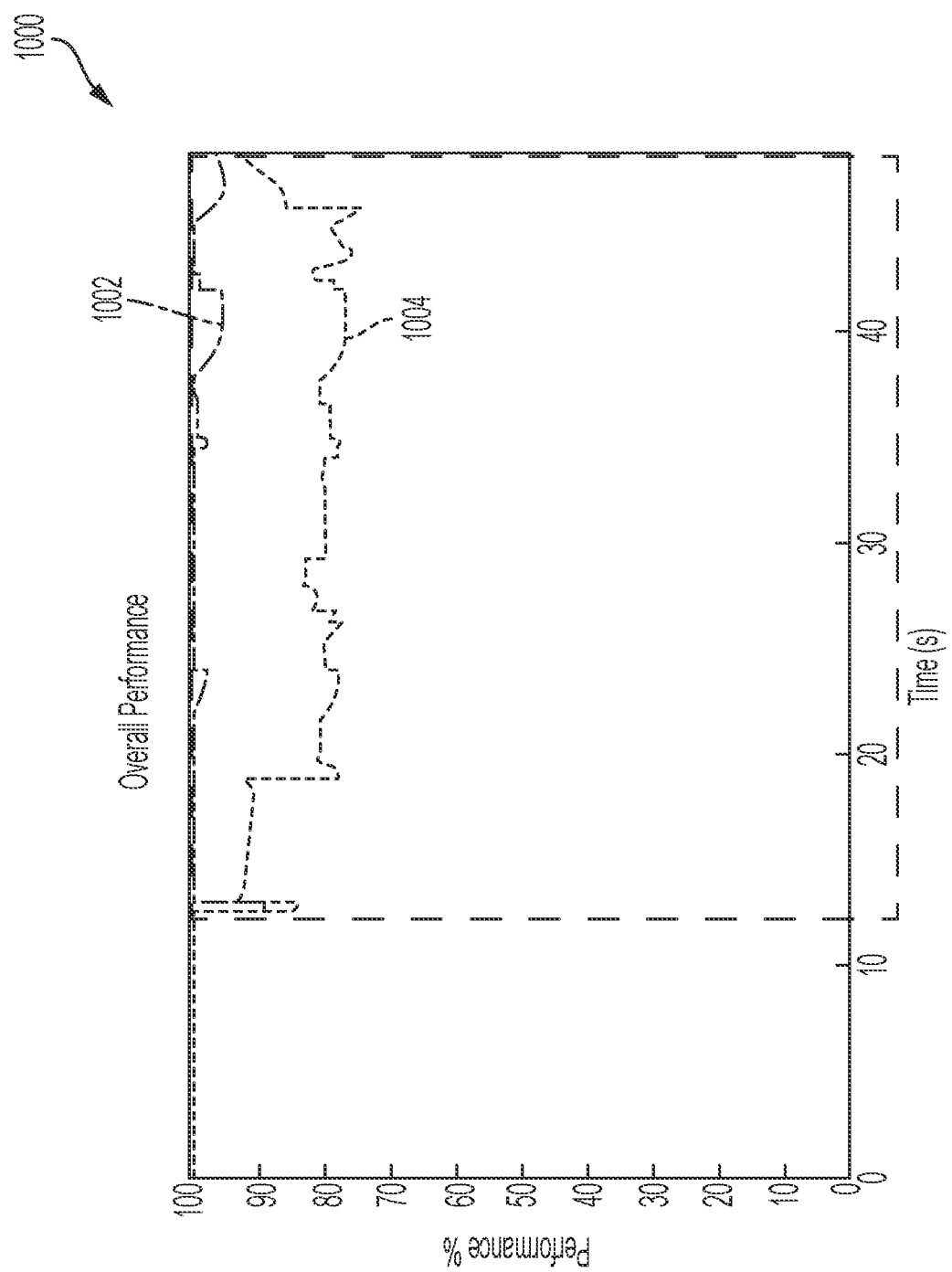
FIG. 10 is an illustrative graph showing performance grades over time for a trial using the third road scenario.

FIG. 10 is an illustrative graph 1000 showing performance grades over time for a trial using the third road scenario. Time is shown along the x-axis and performance grade is shown along the y-axis. Curve 1002 shows the performance grade over time for the cognitive system and curve 1004 shows the performance grade over time for the human driver. Similar to the second road scenario, the performance components within the trial show that the cognitive system obtains higher performance scores. This is due to the cognitive system employing a more conservative/careful driving scheme than use by the human driver.

Figure 11:
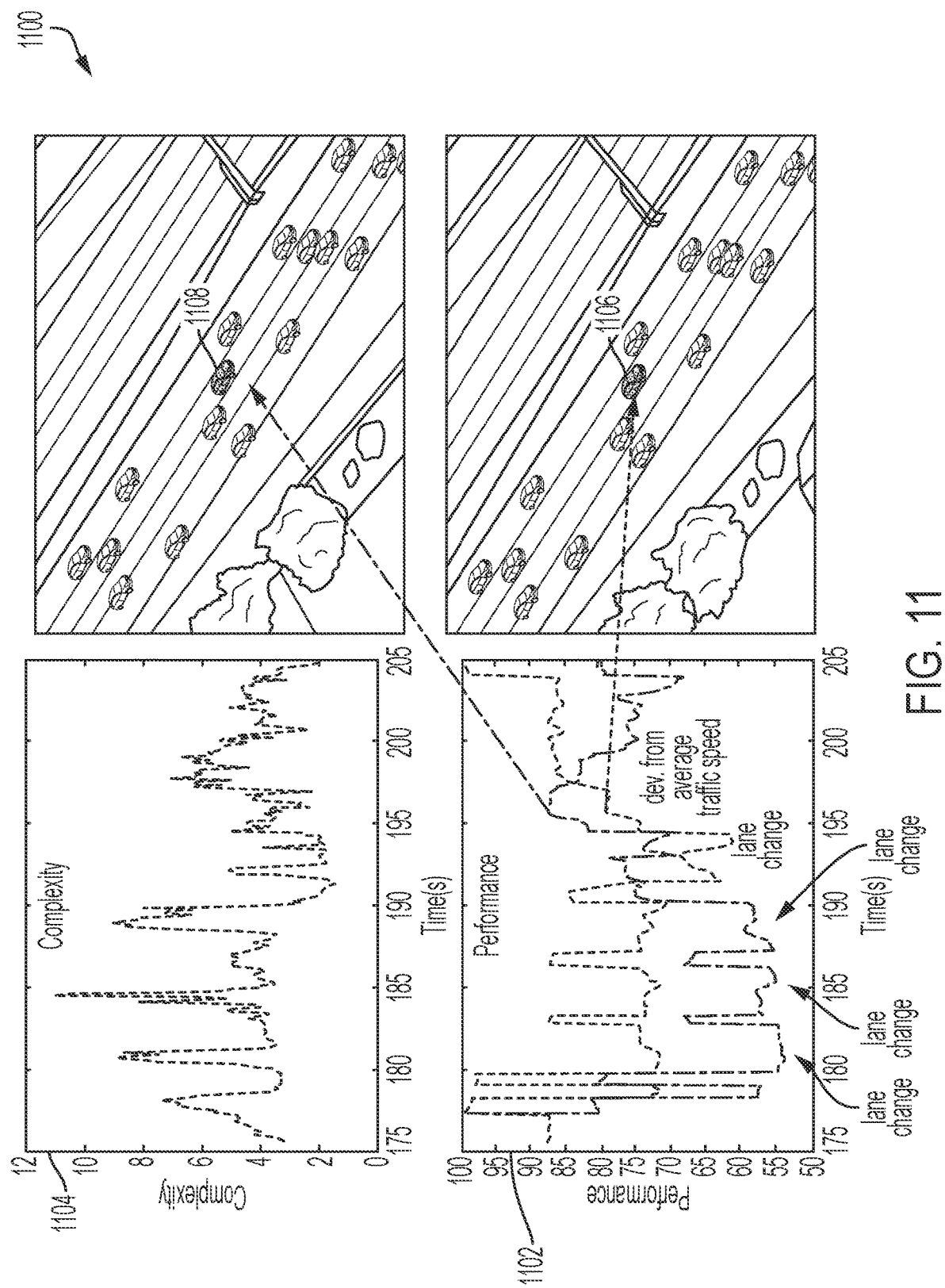
FIG. 11 shows graphs of performance components and complexity for a cognitive system and human driver responding to a training set of data.

FIG. 11 shows graphs 1100 of performance components 1102 and complexity 1104 for a cognitive system 1108 and human driver 1106 responding to a training set of data. The training set is a historical set of data taken from above a stretch of highway during a selected time interval from about 175 seconds to about 205 seconds. This time interval can be partitioned into a first sub-interval lasting from about 175 seconds to about 190 seconds, and a second sub-interval lasting from about 190 seconds about 205 seconds based on the nature of the complexity during these intervals. The complexity in the first sub-interval is on average higher than the complexity in the second sub-interval. Also, the complexity in the first sub-interval shows a greater variation in time than the complexity in the second sub-interval. During the first sub-interval, the human driver 1106 performs on average better than the cognitive system 1108. During the second sub-interval, the cognitive system 1108 performs on average better than the human driver 1106. For the overall time interval, the average performance of the cognitive system 1108 is 72 and the average performance over the human driver 1106 is 80.

Figure 12:
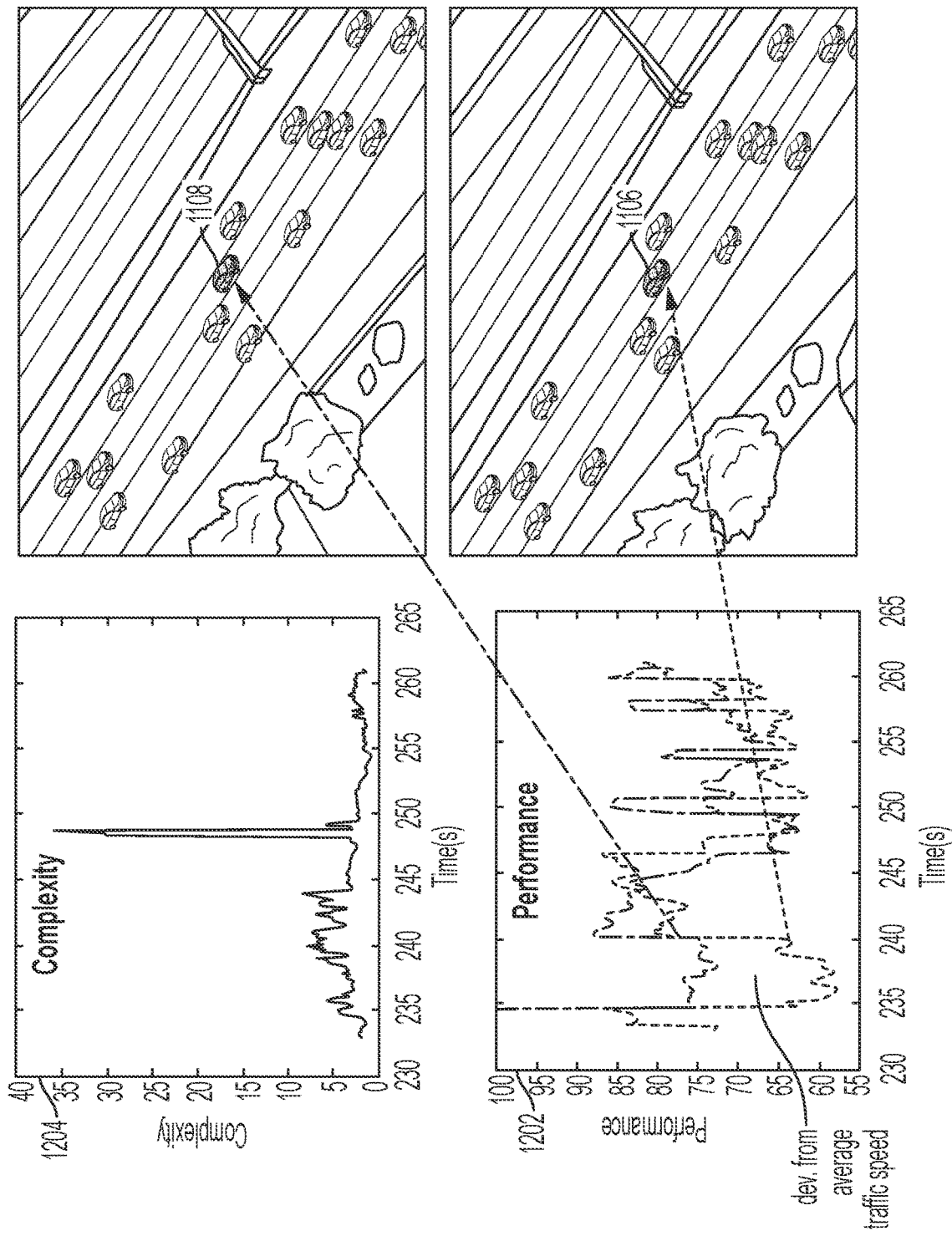
FIG. 12 shows graphs of performance components and complexity for a cognitive system and human driver responding to a second set of historical data.

FIG. 12 shows graphs of performance components 1202 and complexity 1204 for a cognitive system 1108 and human driver 1106 responding to a second set of historical data taken over a time interval from 230 seconds to 265 seconds. The complexity (C) of the time interval remains fairly constant over this time interval except for a dramatic increase at about 249 seconds. For the overall time interval, the average performance (%) of the cognitive system is 77 and the average performance over the human driver is 71.

Figure 13:
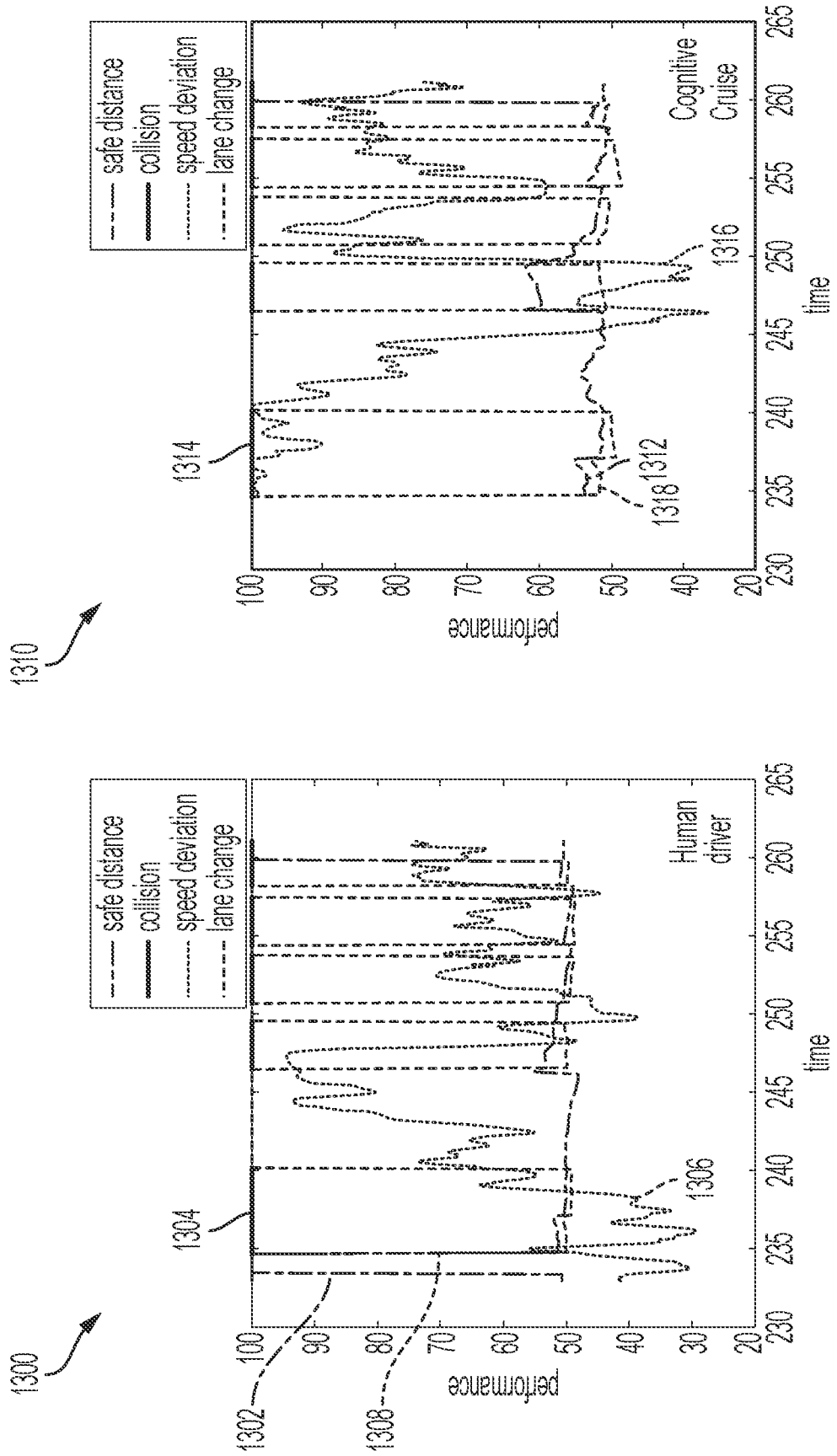
FIG. 13 shows graphs illustrating various performance subgrades for the human driver and cognitive system, respectively, obtained using the training set of data of FIG. 12.

FIG. 13 shows graphs 1300 and 1310 illustrating various performance subgrades for the human driver and cognitive system, respectively, obtained using the training set of data of FIG. 12. Graph 1300 shows performance subgrades obtained over time for the human driver. Curve 1302 is subgrade for the safe distance criteria, curve 1304 is the subgrade for the collision criteria, curve 1306 is the subgrade for the speed deviation criteria, and curve 1308 is the subgrade for the lane change criteria. Graph 1310 shows performance subgrades obtained over time for the cognitive system. Curve 1312 is subgrade for the safe distance criteria, curve 1314 is the subgrade for the collision criteria, curve 1316 is the subgrade for the speed deviation criteria, and curve 1318 is the subgrade for the lane change criteria. Reviewing the graphs 1300 and 1310 and the graph 1200 of FIG. 12, one concludes that the cognitive system achieves the higher average performance grade primarily through reducing the deviation from average traffic speed.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method for operating an autonomous vehicle, comprising:
    inputting a training set of data to a cognitive system;
    operating the cognitive system to generate a planned action for operating the autonomous vehicle in response to the training set of data;
    evaluating the planned action to generate a system performance grade based on at least one basis metric weighted by a coefficient, the at least one basis metric including a deviation from a safe following distance;
    showing the training set of data to one or more humans to obtain a human-based performance grade;
    updating the cognitive system by adjusting the coefficient of the at least one basis metric based on a comparison of the system performance grade to the human-based performance grade; and
    controlling autonomous driving of the autonomous vehicle using the cognitive system.

2. The method of claim 1, further comprising obtaining a human-driven path from the one or more humans responding to the training set of data and evaluating the human-driven path to obtain the human-based performance grade.

3. The method of claim 1, further comprising showing the planned action to the one or more humans and obtaining the human-based performance grade based on an evaluation of the planned action by the one or more humans.

4. The method of claim 1, further comprising updating the cognitive system by reducing a difference between the system performance grade and the human-based performance grade.

5. The method of claim 1, further comprising generating the system performance grade using an evaluation model.

6. The method of claim 1, wherein the at least one basis metric further comprises at least one of: (i) a deviation from a safe lane change gap; (ii) a collision state; and (iii) a deviation from an average traffic speed.

7. The method of claim 1, further comprising determining a complexity score that indicates a difficulty level of a driving scenario for the autonomous vehicle and evaluating the planned action using the system performance grade, the human-based performance grade and the complexity score.

8. A system for operating an autonomous vehicle, comprising:
   a control system for performing a driving action at the autonomous vehicle; and
   a cognitive system for generating the driving action using an evaluation model, wherein the evaluation model is generated by:
   generating a planned action for operating the autonomous vehicle by the cognitive system by operating the cognitive system in response to a training set of data;
   evaluating the planned action to generate a system performance grade based on at least one basis metric weighted by a coefficient, the at least one basis metric including a deviation from a safe following distance;
   showing the training set of data to one or more humans to obtain a human-based performance grade; and
   updating the cognitive system by adjusting the coefficient of the at least one basis metric based on a comparison of the system performance grade to the human-based performance grade.

9. The system of claim 8, wherein the evaluation model is further generated by obtaining a human-driven path from the one or more humans responding to the training set of data and evaluating the human-driven path to obtain the human-based performance grade.

10. The system of claim 8, wherein the evaluation model is further generated by showing the planned action to the one or more humans and obtaining the human-based performance grade based on an evaluation of the planned action by the one or more humans.

11. The system of claim 8, further comprising a comparison module for updating the cognitive system by reducing a difference between the system performance grade and the human-based performance grade.

12. The system of claim 11, wherein the comparison module evaluates the planned action using the system performance grade, the human-based performance grade and a complexity score.

13. The system of claim 8, wherein the evaluation model generates the system performance grade and the system further comprises a comparison model for adjusting the coefficient of the at least one basis metric based on the comparison.

14. The system of claim 8, wherein the at least one basis metric further comprises at least one of: (i) a deviation from a safe lane change gap; (ii) a collision state; and (iii) a deviation from an average traffic speed.

15. An autonomous vehicle, comprising:
   a cognitive system for generating a driving action using an evaluation model, wherein the evaluation model is generated by:
   generating a planned action for operating the autonomous vehicle by the cognitive system by operating the cognitive system in response to a training set of data;
   evaluating the planned action to generate a system performance grade based on at least one basis metric weighted by a coefficient, the at least one basis metric including a deviation from a safe following distance;
   showing the training set of data to one or more humans to obtain a human-based performance grade;
   updating the cognitive system by adjusting the coefficient of the at least one basis metric based on a comparison of the system performance grade to the human-based performance grade; and
   controlling autonomous driving of the autonomous vehicle using the cognitive system.

16. The vehicle of claim 15, wherein obtaining the human-based performance grade further comprises at least one of:
   (i) obtaining a human-driven path from the one or more humans responding to the training set of data and evaluating the human-driven path; and (ii) showing the planned action to the one or more humans and obtaining the human-based performance grade from an evaluation of the planned action by the one or more humans.

17. The vehicle of claim 15, further comprising a comparison module for updating the cognitive system by reducing a difference between the system performance grade and the human-based performance grade.

18. The vehicle of claim 17, wherein the comparison module evaluates the planned action using the system performance grade, the human-based performance grade and a complexity score.

19. The vehicle of claim 15, wherein the evaluation model generates the system performance grade and the vehicle further comprises a comparison module for adjusting the coefficient of the at least one basis metric based on the comparison.

20. The vehicle of claim 15, wherein the at least one basis metric is related to at least one of: (i) a deviation from a safe lane change gap; (ii) a collision state; and (iii) a deviation from an average traffic speed.

* * * * *